United States Patent [19]

Haselkorn

[11] Patent Number: 4,868,056
[45] Date of Patent: Sep. 19, 1989

[54] OXYGEN PROTECTION SYSTEM FOR CARBON

[75] Inventor: Michael H. Haselkorn, Peoria, Ill.

[73] Assignee: Avco Corporation, Providence, R.I.

[21] Appl. No.: 150,901

[22] Filed: Feb. 1, 1988

[51] Int. Cl.$^4$ ............................................... B32B 9/00
[52] U.S. Cl. ..................................... 428/408; 428/698
[58] Field of Search .................... 428/408, 698, 699

[56] References Cited

U.S. PATENT DOCUMENTS

| | | | |
|---|---|---|---|
| 1,948,382 | 2/1934 | Johnson | 428/408 X |
| 3,131,089 | 4/1964 | Grulke et al. | 428/408 |
| 3,914,508 | 10/1975 | Hooton et al. | 428/408 |
| 3,936,574 | 2/1976 | Marin | 428/408 |
| 4,476,164 | 10/1984 | Veltri et al. | 428/408 X |
| 4,599,256 | 7/1986 | Vasilos | 428/408 X |
| 4,668,579 | 5/1987 | Strangman et al. | 428/408 X |

Primary Examiner—Nancy A. B. Swisher
Attorney, Agent, or Firm—Abraham Ogman

[57] ABSTRACT

The invention deals with an oxidation protection system for an inhibited carbon substrate which comprises a friable layer applied to the carbon substrate surface. The friable layer is then coated with a dense oxidation resistant outer layer.

8 Claims, 1 Drawing Sheet

OXYGEN PROTECTION SYSTEM FOR CARBON

BACKGROUND

The invention relates to a method of coating carbon composite materials to provide oxidation resistance in such materials.

Carbon composites consist of fibrous carbon material such as carbon or graphite fibers, woven into a porous skeleton and a non-fibrous carbon matrix which fills the pores in the woven skeleton. Carbon/carbon components have great potential for use in high temperature applications because they are strong materials, are of low density and exhibit strong fracture toughness values. Another unusual characteristic of a carbon/carbon composite is that its strength increases with increasing temperture to 5000° F.

The major drawback for the wide spread use of carbon/carbon composites is their poor oxidation resistance at elevated temperatures. At temperatures above 800° F. in the presence of oxygen, oxidation of the carbon occurs which results in a significant decrease in the mechanical properties of the carbon/carbon composite. Studies have shown that the tensile strength of the carbon/carbon composite may decrease up to 50 percent because of oxidation with correponding weight losses of only 10–15 percent.

Silicon carbide (SiC) coatings in many forms have been suggested, developed and used as an oxygen diffusion barrier to prevent oxidation of the carbon/carbon composite. The SiC coatings work extremely well for applications above 1600° F. where the carbon/carbon does not undergo thermal cycling (i.e.) 150 hours a 1700° F. The SiC provides oxidation protection for the carbon/carbon at these temperatures because the SiC will oxidize to $SiO_2$ and the $SiO_2$ will seal the cracks which develop in the SiC coating. Cracks develop in the SiC coating because of the thermal expansion difference between the SiC coating and the carbon/carbon composite. Below 1600° F. the SiC does not provide oxidation protection because at these temperatures oxidation of the SiC to $SiO_2$ will not occur. As a result, the cracks in the SiC coating are not sealed and the carbon/carbon composite is exposed to the oxidizing atmosphere.

Under conditions of thermal cycling the SiC cannot provide oxidation protection for carbon/carbon because each time the composite is heated and cooled the differences in thermal expansion coefficients between the carbon/carbon and SiC coating causes stresses to develop in the SiC coating. These streses increase both the number of cracks and/or the width of the existing cracks.

In severe thermal cycle spalling of the SiC coating can occur. The effect of the increased cracking and spalling is to expose portions of the carbon/carbon composite to the oxidizing atmosphere A dual coating system was developed in an attempt to overcome the problems associated with the SiC coating. This dual coating system can consist of a conversion layer as well as a sealant material. The purposee of the conversion layer is to provide a gradient in the thermal expansion from the carbon body to the outer SiC layer. While the conversion layer improves the bonding of the SiC coating to the carbon/carbon/substrate and reduces some of the stresses in the coatings caused by thermal expansion mismatch, it does not prevent the SiC from cracking during thermal cycling.

In order to prevent oxidation through the cracks in the SiC coating the dual coatings provide a sealant material to flow into and seal the cracks which develop in the SiC outer coating. The sealant usually consists of a low temperture glass former.

However, these coating systems only provide oxidation protection to a carbon/carbon substrate for up to 350–450 hours under thermal cycling between 2500° to 1200° F.

The probable reason for failure is this dual coating system after only 350 hours of cycling is either the width of the cracks which develop in the SiC becomes too large for low temperature glassy phase to seal effectively and/or the quantity of glass phase sealant is not great enough to completely seal all of the cracks enabling large portion of the carbon/carbon composite to become exposed to the oxidizing atmosphere.

As mentioned previously, surface coatings methods utilized to protect the carbon/carbon composite from oxidation have not been successful because of cracking and spalling of the SiC coating- because of the large thermal gradients.

Conversion layers and glassy phase sealant layers have been only partially successful because once the coating is broken or the amount of glassy phase sealant is consumed, the underlying carbon composite material is vulnerable to oxidation. U.S. Pat. No. 4,582,751 teaches a method of providing additional oxidation protection in the form of an oxidation inhibitor within the pores of the carbon/carbon composite. Other methods for providing oxidation protection within the carbon/carbon composite. Other methods for providing oxidation protection within the carbon/carbon substrate are disclosed in Shaffer U.S. Pat. No. 4,321,298.

Thus, the current state of the art for oxidation protection systems consist of the following:
(a) inhibited carbon/carbon substrate
(b) boron rich interlayers in dual layer systems.
(c) SiC outer coatings.

Though this discussion will be limited to the use of boron with silicon carbide, as one progresses it will become clear that the inventive concept deals primarily with a material structure which may be applicable with other combinations of compatible materials.

DEFINITIONS

The term friable shall apply to material structure which is very porous and easily crumbled when stressed. In this application the friable material is expected to crumble and pick up the stresses created by companion material being used as a sealant to prevent oxygen from reacting with the carbon substrate.

Carbon or carbon substrate shall be used generically to mean carbon, graphite, carbon composite such as carbon block, carbon fabric and carbon/carbon composite and the like.

Stable when relating to a material property means that the material will not react, a decompose or otherwise undergo serious degradation in structure and properties.

OBJECTS

It is an object of the invention to provide an oxidation protection system for carbon which avoids the limitations and disadvantages of prior coatings and systems.

It is another object of the invention to provide a multiple component oxidation protection system for carbon which includes a friable layer with an inhibited carbon/carbon substrte which yields under stress and thereby limits cracking of the outer coating component.

It is still another object of the invention to provide a three component silicon carbide based oxidation protection system for carbon which includes an inhibited carbon/carbon substrate a friable boron based underlayer beneath a silicon carbide outer coating.

BRIEF DESCRIPTION OF THE INVENTION

In accordance with the invention there is provided a layer of friable material between a relatively dense layer which is relatively stable at high temperatures in an oxidizing environment. In the preferred embodiment a friable layer of boron carbide layer is located beneath a relatvely dense SiC layer.

The features and advantages of the present invention will be further appreciated upon reading the detailed description which follows in conjunction with the following drawings.

FIGURES

FIG. 1 depicts a carbon substate containing an oxidation resistant coating in accordance with the invention.

DETAILED DESCRIPTION OF THE STRUCTURE AND OPERATION

Figure 1:
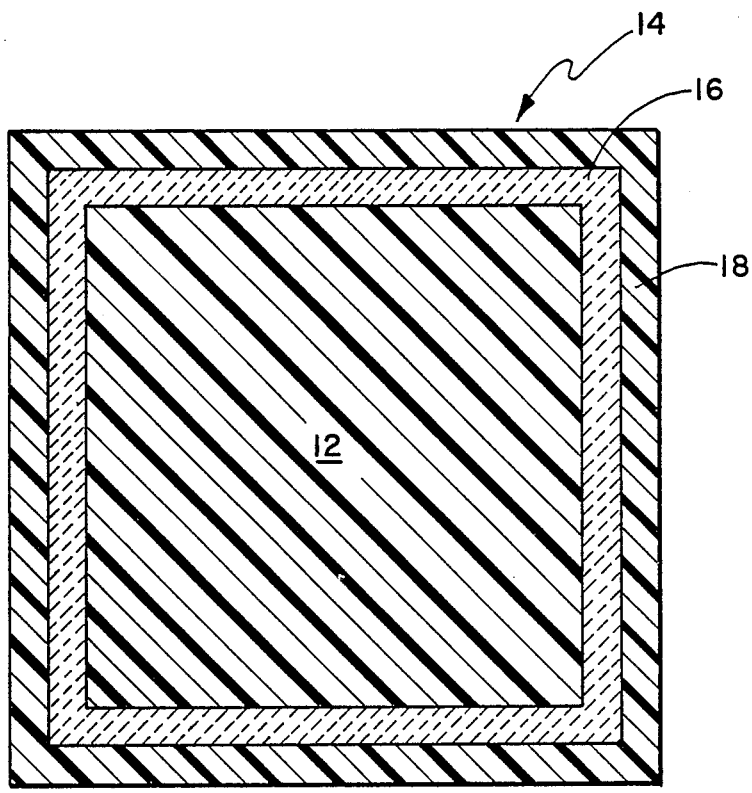

Referring to FIG. 1 there is shown a carbon substrate 12 which preferably is a carbon/carbon substrate with an oxidation resistant outer coating 14. The oxidation protection system will perform with a porous carbon block substrate which may or may not be inhibited.

In this case the coating 14 is a dual system comprising a friable layer 16 beneath a relatively dense stable layer 18 In the preferred embodiment the layer 16 is boron carbide. The relatively dense layer 18 is SiC.

It should be understood however that there may other combinations of friable and dense materials which are compatible with carbon and may act similarly to the carbon and SiC combination.

The function of the friable layer is two fold. First, this layer supplies the material (ie. boron), to form the aforementioned glassy phase which will seal the cracks which develop in the SiC layer during the thermal cycling. A second purpose of developing a friable layer beneath a relatively dense SiC layer is to reduce the stresses which develop in the SiC layer during thermal cycling by cracking. Thus, instead of cracks developing in the SiC outer surface coating the cracks develop in the friable layer. The cracks which develops in the friable layer, boron carbide, for example, if they are not large enough to cause large portions of the dense SiC coating to spall, are easily "healed by the low temperature glassy phase formation and they do not expose portions of the carbon substrate to the oxidizing environment.

In the laboratory thermal cycling is done in many ways. A most severe method is to raise the temperature of a body gradually and in an oxidizing atmosphere to the vicinity of 2500° F. until the body stabilizes at that temperature. It is then lowered to an intermediate temperature or temperatures and then to room temperature. The body is initially and then periodically weighted to determine weight loss due to oxidation of the carbon. A 2% or greater loss is considered an excessive weight loss.

A laboratory dual boron carbide —SiC system coating on an inhibited carbon sample achieved over 1000 hours of cycling before the test was stopped for excessive weight loss. This was and is unprecedented performance of a SiC coated system.

The friable boron carbide (B$_4$C) layer may be produced in at least two ways:

1 React gaseous boron oxide (B$_2$O$_3$) with the surface of the carbon at a temperature of at least 2700° F. in a vacuum. (The vacuum is required to keep the boron oxide in gaseous form.) In general, the following chemical reaction occurs on the surface of the carbon.

$$B_2O_3 + 7C \rightarrow B_4C + 6CO$$

When this reaction occurs the void volume is approximately 50% of the original carbon volume. That is, when the boron oxide react with the carbon to form boron carbide the volume of the boron carbide is approximately half that of the original carbon because carbon monoxide (CD) is given off as a gaseous phase. The thickness of this "etched" layer is controlled by time, temperature and having sufficient reactants (oxide gas) available.

In contrast with the aforementioned European Patent the boron carbide layer is not completely filled with silicon and/or silicon alloy. Instead some of the porosity is left in the layer. Preferably, the remaining porosity is evenly spaced throughout this layer. One method used to fill in the porosity with silicon involves Chemical Vapor Deposition (CVD). Surface layer of dense silicon carbide is then deposited.

2 An alternative method of producing a boron carbide layer with the desired porosity is to react boron oxide with the surface of the carbon at pressure below 900 torr and in the presence of H$_2$.

The following reaction then occurs:

$$C + 4BCl_3 \pm 6H_2 \rightarrow B_4C + 23HCl$$

By controlling the process temperature, partial pressure of reactant gasses as well as reactant gas flow a B$_4$C with controlled porosity can be deposited on the surface of the carbon.

To obtain the maximum amount of oxidation protection a SiC layer is applied on top of the porous interlayer. This SiC layer can be applied by Chemical Vapor Deposition (CVD) techniques, or any other coating method such as dipping, spraying, evaporation, sputtering, pack cementation etc.

While a preferred embodiment of the present invention has been described and illustrated, the invention should not be limited thereto, but may be otherwise embodied with the scope of the following claims.

I claim:

1. An oxidation protective coating for a carbon substrate comprising a friable layer of a compatible material on the surface of the carbon substrate and a dense layer of a material which is stable at high operating temperatures deposited on the friable layer.

2. A coating as defined in claim 1, where the carbon substrate is inhibited.

3. A coating as defined in claim 1, where the friable layer is boron carbide and the the dense layer is silicon carbide.

4. A coating as defined in claim 3 where the carbon substrate is inhibited with a source of boron.

5. An oxidation protection system for a porous carbon substate comprising an inhibiter within the pores of the carbon substrate, a friable coating on the surface of the carbon substrate, and a dense oxidation stable outer coating on the friable coating.

6. An oxidation protection system as described in claim 5 where the friable coating is a porous boron carbide coating.

7. An oxidation protection system as described in claim 5 where the inhibiter is a source of boron and the friable coating is boron carbide.

8. An oxidation frotection system as described in claim 7 where the outer coating is silicon carbide.

* * * * *